US009123290B1

(12) United States Patent  
Cho et al.

(10) Patent No.: US 9,123,290 B1  
(45) Date of Patent: Sep. 1, 2015

(54) ADJUSTABLE DISPLAY DEVICE (71) Applicant: LG Display Co., Ltd., Seoul (KR)

(72) Inventors: Seok-Hyo Cho, Goyang-si (KR); Chul Park, Goyang-si (KR)

(73) Assignee: LG DISPLAY, CO., LTD., Seoul (KR)

( * ) Notice: Subject to any disclaimer, the term of this patent is extended or adjusted under 35 U.S.C. 154(b) by 0 days.

(21) Appl. No.: 14/577,516

(22) Filed: Dec. 19, 2014

(30) Foreign Application Priority Data

Apr. 29, 2014 (KR) .......................... 10-2014-0051848  
Jul. 16, 2014 (KR) .......................... 10-2014-0089831

(51) Int. Cl.  
*G06F 1/16* (2006.01)  
*G09G 3/32* (2006.01)

(52) U.S. Cl.  
CPC ............ *G09G 3/3208* (2013.01); *G06F 1/1601* (2013.01); *G06F 1/1613* (2013.01); *G06F 1/1626* (2013.01); *G06F 1/1652* (2013.01)

(58) Field of Classification Search  
CPC ... G06F 1/1601; G06F 1/1613; G06F 1/1626; G06F 1/1652  
USPC ............ 361/679.01, 679.21, 679.22, 679.26, 361/679.3, 679.56, 679.55; 455/575.1, 455/575.3, 575.4, 575.9  
See application file for complete search history.

(56) References Cited

U.S. PATENT DOCUMENTS

| | | | |
|---|---|---|---|
| 8,654,519 B2* | 2/2014 | Visser et al. ............. | 361/679.21 |
| 2003/0109286 A1* | 6/2003 | Hack et al. ................... | 455/566 |
| 2005/0041012 A1* | 2/2005 | Daniel et al. .................. | 345/156 |
| 2011/0043976 A1* | 2/2011 | Visser et al. ............. | 361/679.01 |
| 2013/0083496 A1 | 4/2013 | Franklin et al. | |
| 2013/0155655 A1* | 6/2013 | Lee et al. ...................... | 362/97.1 |
| 2014/0036162 A1 | 2/2014 | Sato et al. | |
| 2014/0198465 A1* | 7/2014 | Park ............................. | 361/749 |
| 2015/0035812 A1* | 2/2015 | Shin et al. ..................... | 345/204 |

FOREIGN PATENT DOCUMENTS

| | | |
|---|---|---|
| EP | 2592614 A1 | 5/2013 |
| EP | 2765622 A2 | 8/2014 |
| EP | 2793210 A1 | 10/2014 |
| JP | 2006-23676 A | 1/2006 |

* cited by examiner

*Primary Examiner* — Anthony Haughton  
(74) *Attorney, Agent, or Firm* — Dentons US LLP (57) ABSTRACT

A display device capable of being adjusted between flat and curved comprising: a display panel; a back cover system including: at least two angle block modules, one in each half of the back cover system, the angle block modules, wherein moving the angle block modules changes a curvature of the display panel; a driving system to move the angle block modules. A driving system includes a motor; a gear connected to the motor; block units arranged in a row in the angle block module and positioned at a rear of the display panel; a shaft bearing connecting a first block unit to a second block unit. A flatness controlling unit comprises an angle block module having a flatness controlling groove; a wire guided by the flatness controlling groove; and a tension adjusting part including a portion of the wire and a spring connected to the portion of the wire.

28 Claims, 10 Drawing Sheets

ADJUSTABLE DISPLAY DEVICE

The application claims the benefit of priority to Korean Patent Applications No. 10-2014-0051848 filed in Korea on Apr. 29, 2014 and No. 10-2014-0089831 filed in Korea on Jul. 16, 2014, which are incorporated by reference for all purposes as if fully set forth herein.

BACKGROUND

1. Field of the Disclosure

The present disclosure relates to an adjustable or variable display device that is able to be used in a flat mode and a curved mode, and more particularly, to an adjustable or variable display device with improved flatness.

2. Discussion of the Related Art

With rapid development of information technologies, display devices for displaying a large amount of information have been recently developed. More particularly, various flat panel display (FPD) devices have been introduced.

The flat panel display devices include, for example, liquid crystal display (LCD) devices, plasma display panel (PDP) devices, field emission display (FED) devices, electroluminescence display (ELD) devices, and organic electroluminescent display (OLED) devices. The flat panel display devices generally have a thin profile, light weight, and low power consumption; and have been rapidly replacing cathode ray tubes (CRT).

Recently, curved display devices have emerged as a new generation display device because the curved display devices enable a user to be further immersed in the content, to watch realistic images, and to feel more comfortable.

In curved display devices, because a distance from the eyes of the user to a center of the screen is equal to a distance from the eyes of the user to sides of the screen, distortion of an image at the sides of the screen is minimized.

Meanwhile, variable display devices having the advantages of the flat panel display devices with wide viewing angles and curved display devices with increased immersion and comfort properties have been pursued and researched.

For the convenience of the user, the variable display devices are implemented in both a flat mode to provide wide viewing area, and in a curved mode to improve immersion while watching.

SUMMARY

Accordingly, the present invention is directed to a variable display device that substantially obviates one or more of the problems due to limitations and disadvantages of the related art.

An advantage of the present invention is to provide a variable display device that is able to be implemented in both a flat mode and a curved mode.

Another advantage of the present invention is to provide a variable display device that has an accurate curvature when it is implemented in a curved mode, minimizes vibrations and noises when it is changed between the flat mode and the curved mode, and has a relatively light weight and thin profile.

Another advantage of the present invention is to provide a variable display device that improves flatness when it is implemented in the flat mode.

To achieve these and other advantages and in accordance with the purpose of embodiments of the invention, as embodied and broadly described, a variable display device capable of being adjusted between flat and curved comprising: first and second angle block modules, one in each half of a rear of the device, the first and the second angle block modules capable of being moved, wherein moving the first and the second angle block modules changes a curvature of the display device; and a driving system to move the first and the second angle block modules.

A display device capable of being adjusted between flat and curved comprising: an adjusting system at a rear of the display device including: first and second angle block modules capable of being moved, wherein moving the angle block modules changes a curvature of the display device; and a driving system coupled to the angle block module, wherein the driving system moves the angle block modules.

A display device capable of being adjusted between flat and curved comprising: an angle block module at a rear of the display device capable of being moved, wherein moving the angle block module changes a curvature of the display device; and a driving system to move the angle block module.

A flatness controlling unit of a display device comprising: a driving system coupled to the display device; an angle block module coupled to the driving system having a flatness controlling groove; a wire guided by the flatness controlling groove having a first end connected to the driving system and a second end connected to the angle block module; a tension adjusting part including a portion of the wire and a spring connected to the portion of the wire.

A driving system to curve and flatten a display device comprising: a driver generating motion in a first and a second direction; a driver component connected to the driver transferring the motion to an angle block module; block units arranged in a row in the angle block module and positioned at a rear of the display device; a shaft bearing connecting a first block unit to a second block unit; wherein the motion generates movement of the block units to move a portion of the display device with respect to a direction normal to a center of the display device.

A method of adjusting a display device between flat and curved, the display device having an angle block module at a rear of the display device, the angle block module capable of being moved, and a driving system to move the angle block module, the method comprising the step of: activating the driving system to move the angle block module to adjust a curvature of the display device.

BRIEF DESCRIPTION OF THE DRAWINGS

The accompanying drawings, which are included to provide a further understanding of the disclosure and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings. The same reference numbers may be used throughout the drawings to refer to the same or like parts.

Figure 1A:
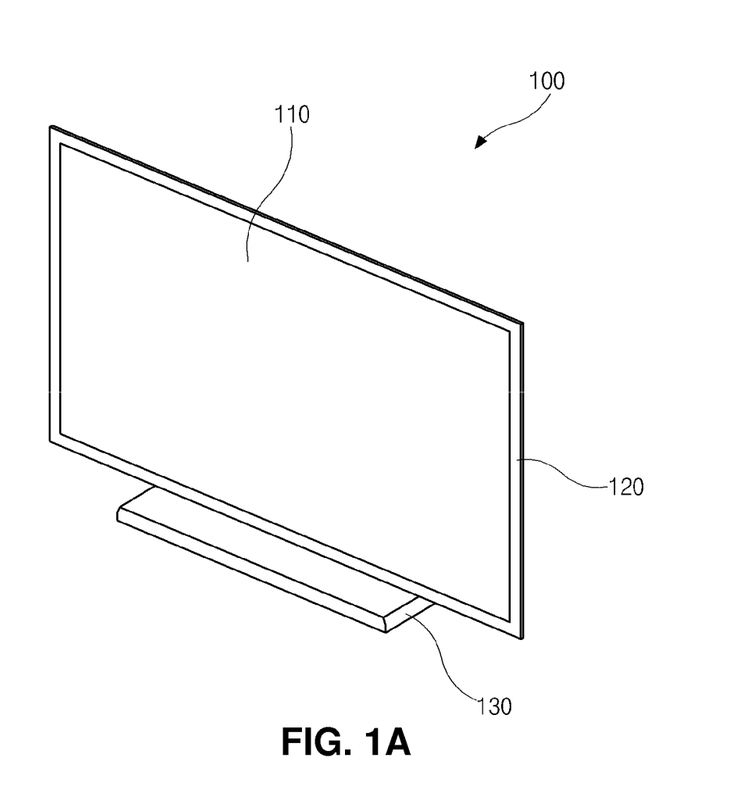
FIG. 1A and FIG. 1B are perspective views schematically illustrating a variable display device according to an exemplary embodiment of the present invention.
Figure 1B:
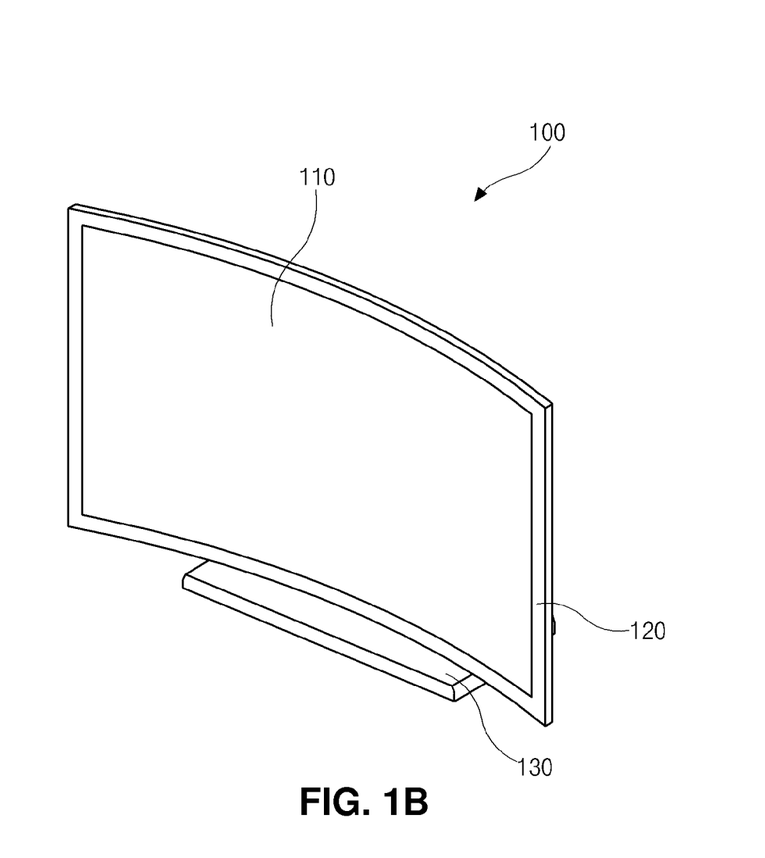
Figure 2:
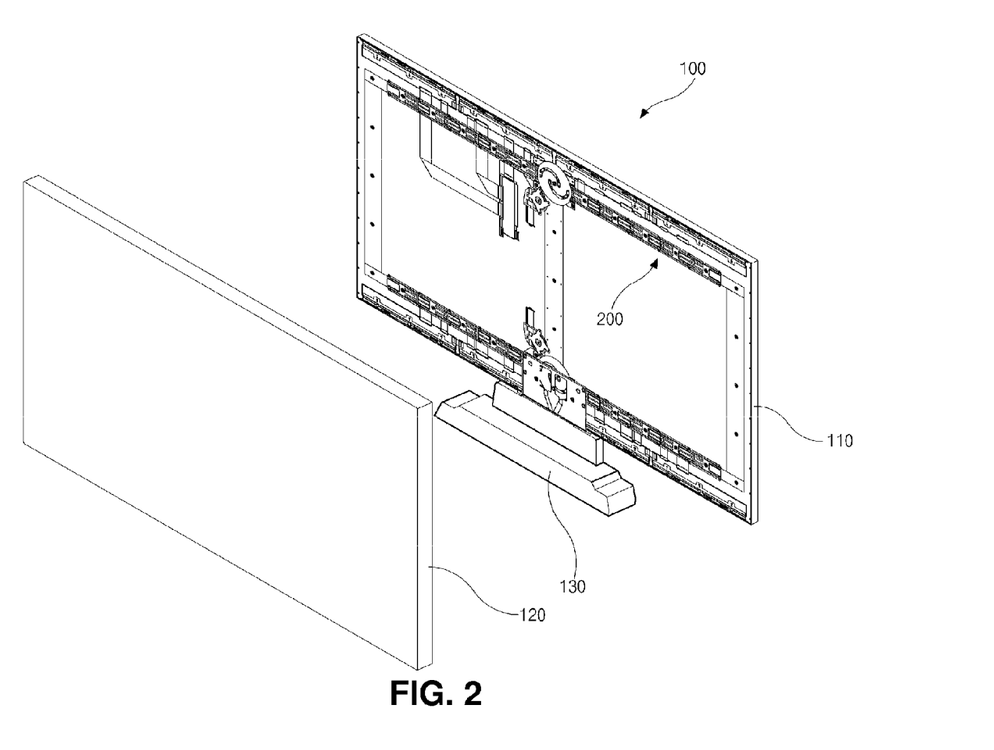
FIG. 2 is a perspective view schematically illustrating a rear side of a variable display device according to an exemplary embodiment of the present invention.

FIG. 1A and FIG. 1B are perspective views schematically illustrating a variable display device according to an exemplary embodiment of the present invention, and FIG. 2 is a perspective view schematically illustrating a rear side of a variable display device according to an exemplary embodiment of the present invention.

In FIGS. 1A and 1B and FIG. 2, the variable display device 100 according to the exemplary embodiment of the present invention includes a display panel module 110, an external case 120, and a support 130. The display panel module 110 displays images, and the external case 120 accommodates the display panel module 110. The support 130 is connected to a lower part or a rear part of the external case 120 for mounting the variable display device, and is rested on a desk, fixed to a surface of a wall, or mounted by any other of many techniques and positioned for viewing.

Here, the display panel module 110 may include a display panel, which may be one of a liquid crystal display (LCD) device, a plasma display panel (PDP) device, a field emission display (FED) device, an electroluminescence display (ELD) device, and an organic light emitting diode (OLED) device. Beneficially, the display panel module 110 may include an OLED device, which is flexible and displays images without a problem even when it is curved.

Because OLED devices are self-luminescent, the OLED devices do not require a backlight unit and have a thin profile and light weight as compared with LCD devices, which are non-emissive.

In addition, the OLED devices have better viewing angles and contrast ratio than comparable LCD devices and have lower power consumption. The OLED devices are driven by low voltage of direct current (DC), and have relatively fast response time. Since the OLED devices include solid components, the OLED devices are resistant to outer impacts and are stable under temperatures within a wide range.

Also, because manufacturing processes of the OLED devices are simpler, manufacturing costs of the OLED device are further reduced as compared with an LCD device.

Here, the display panel, which is an OLED device, includes a first substrate and a second substrate facing each other. The first and second substrates are spaced apart from and attached to each other by a protection layer having an adhesive property.

More particularly, although not shown in the figures, a driving thin film transistor is formed in each pixel region on the first substrate, and a first electrode, an organic light-emitting layer, and a second electrode are sequentially formed on the first substrate. The first electrode is formed in each pixel region and connected to the driving thin film transistor. With applied voltage, the organic light-emitting layer emits light. The organic light-emitting layer may be formed in each pixel region. The second electrode may be formed all over the first substrate and covers the organic light-emitting layer.

The organic light-emitting layer may emit red, green, or blue light and may be generally formed by patterning an organic material emitting red, green, or blue light in each pixel region. Thus, red, green, and blue pixel regions are sequentially arranged.

The first and second electrodes and the organic light-emitting layer constitute a light-emitting diode. Here, the display panel module 110 may include the first electrode as an anode and the second electrode as a cathode.

The display panel is modularized with a backcover and may include a protective cover window to form the display panel module 110. The backcover covers a rear surface and part of side surfaces of the display panel, and the front side of the backcover is opened such that an image displayed by the display panel is shown to the outside.

The cover window may be assembled at the front side of the backcover to protect the display panel.

As illustrated in FIG. 1A, when the display panel module 110 displaying images is driven in a flat mode, the variable display device 100 including the display panel module 110 has relatively wide viewing area and provides many viewers with the images displayed by the display panel module 110.

On the other hand, as illustrated in FIG. 1B, when the display panel module 110 is driven in a curved mode, the variable display device 100 enables a viewer to be further immersed in watching, to watch realistic images and to feel more comfortable.

Namely, because the variable display device 100 is variably driven in the flat mode and the curved mode, a user can selectively use the variable display device 100 in the flat mode or curved mode as occasion demands.

The variable display device 100 is variably oriented in the flat mode or the curved mode by a backcover system 200, which is installed at a rear surface of the display panel module 110, as illustrated in FIG. 2. This will be described in more detail with reference to accompanying drawings.

Figure 3:
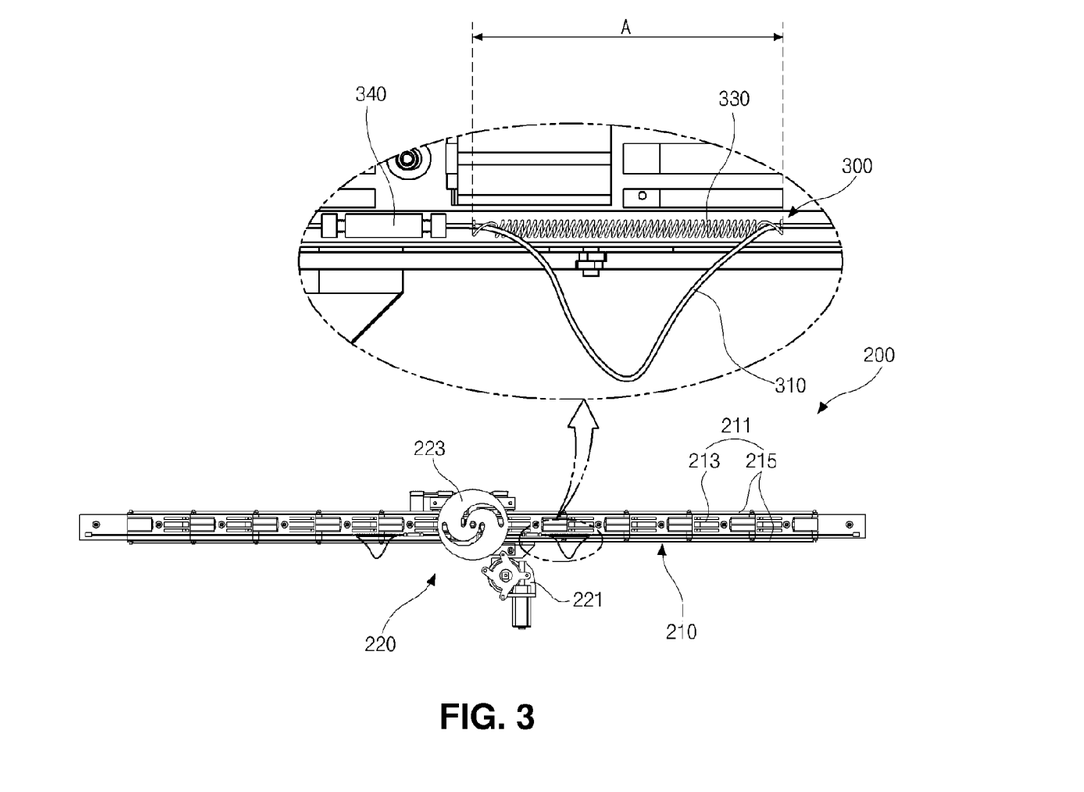
FIG. 3 is a view schematically illustrating a backcover system according to an exemplary embodiment of the present invention.
Figure 4:
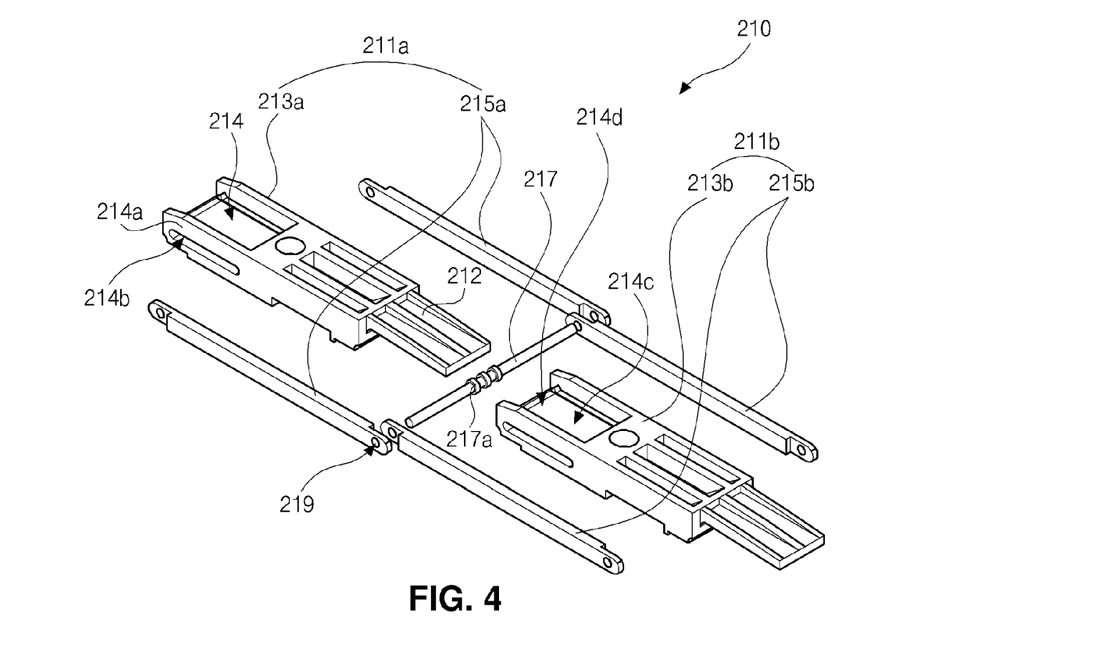
FIG. 4 is an exploded perspective view schematically illustrating an angle block module according to an exemplary embodiment of the present invention.

FIG. 3 is a view schematically illustrating a backcover system according to an exemplary embodiment of the present invention. FIG. 4 is an exploded perspective view schematically illustrating an angle block module according to an exemplary embodiment of the present invention.

In FIG. 3 and FIG. 4, the backcover system 200 is installed at a rear surface of the backcover of the display panel module 110 of FIG. 2, and the backcover system 200 includes an angle block module 210, a driving system 220, and a flatness controlling unit 300. The driving system 220 supplies power to the angle block module 210. An angle block module is a mechanical structure attached to the display device and capable of being moved to adjust the curvature of the display device.

Here, a plurality of block units 211 are arranged in a row in the angle block module 210. Each block unit 211 includes an angle block 213 and links 215. The links 215 convert rotary motion delivered by the driving system 220 into rectilinear motion. A shaft bearing 217 of FIG. 4 is disposed between adjacent block units 211. The shaft bearing 217 connects the links 215 of each block unit 211 and also connects the links 215 of adjacent block units 211. The shaft bearing 217 raises and lowers edges of the angle blocks 213 contacting each other.

For example, the driving system 220 includes a motor 221 as a driver generating rotary power and a gear 223 as a driver component delivering rotary motion of the motor 221 into the links 215. However, the driving system may include other drivers or systems that may generate movement or power such as those using hydraulic, pneumatic, piston, actuator, servos, electromagnetic, and the like.

The angle block module 210 is disposed at each of both left and right sides with the driving system 220 at the center of a width of the display module 110 of FIG. 2. Here, viewing the angle block module 210 in detail with reference to FIG. 4, the plurality of block units 211a and 211b are arranged in a row in the angle block module 210, and each block unit 211a and 211b includes the angle block 213a and 213b and the links 215a and 215b, which are disposed at both sides of the angle block 213a and 213b.

That is, in the first block unit 211a, the first angle block 213a is disposed between the first links 215a. The second block unit 211b is disposed next to the first block unit 211a, and in the second block unit 211b, the second angle block 213b is disposed between the couple of second links 215b, which are connected to the first links 215a.

In addition, the shaft bearing 217 is disposed between the first and second block units 211a and 211b, i.e., between the first and second angle blocks 213a and 213b and is perpendicular to a length direction of the first and second links 215a and 215b. Ends of the first and second links 215a and 215b are connected to each other through the shaft bearing 217.

More particularly, each of the first links 215a has a first end and a second end, and each of the second links 215b has a third end and a fourth end. The bearing holes 219 are formed at the first and second ends of the first links 215a and the third and fourth ends of the second links 215b, respectively. The shaft bearing 217 is inserted into the bearing holes 219 at the first ends of the first links 215a and the third ends of the second links 215b corresponding to each other, and the first ends of the first links 215a and the third ends of the second links 215b are connected to each other through the shaft bearing 217.

Here, the first end of each first link 215a has an outer surface on the same plane as an outer surface of a portion of the first link 215a excluding the first and second ends and has a thinner thickness than the portion of the first link 215a. The third end of each second link 215b has an inner surface on the same plane as an inner surface of a portion of the second link 215b excluding the third and fourth ends and has a thinner thickness than the portion of the second link 215b. The first end of the first link 215a and the third end of the second link 215b, which contact each other, have a structure of engaging each other.

That is, the first end of the first link 215a extends from an outer side of the portion of the first link 215a, and the third end of the second link 215b extends from an inner side of the portion of the second link 215b.

Accordingly, the first end of the first link 215a and the third end of the second link 215b engage each other, and the first and second link 215a and 215b are installed in a line with each other, so that the angle block module 210 may be prevented from increasing in volume.

Meanwhile, the second end of each first link 215a has an inner surface on the same plane as an inner surface of the portion of the first link 215a excluding the first and second ends and has a thinner thickness than the portion of the first link 215a. The fourth end of each second link 215b has an outer surface on the same plane as an outer surface of the portion of the second link 215b excluding the third and fourth ends and has a thinner thickness than the portion of the second link 215b.

Each of the first and second angle blocks 213a and 213b has a substantially rectangular shape with two long sides and two short sides. The long sides have a length corresponding to the length of the first and second links 215a and 215b. The short sides are perpendicular to the long sides and are shorter than the long sides. A protrusion 212 is formed at one of the short sides of each angle block 213a and 213b.

The protrusion 212 is thinner and narrower than each angle block 213a and 213b. In addition, the protrusion 212 is formed to be inclined toward the backcover of the display panel module 110 of FIG. 2 with a predetermined angle from one end of the protrusion 212 at the first short side to the other end of the protrusion 212.

Here, the short sides of the angle blocks 213a and 213b, where the protrusions 212 are formed, may be referred to as first short sides, and the short sides of the angle blocks 213a and 213b opposite to the first short sides may be referred to as second short sides. A raised part 214 is formed at the second side of each angle block 213a and 213b. The protrusion 212 of the first angle block 213a is put on and is combined with the raised part 214 of the second angle block 213b.

The raised part 214 has a stepped shape corresponding to the width and thickness of the protrusion 212. Raised part sides 214a are formed at both sides of the raised part 214.

A plurality of holes may be formed in each of the angle blocks 213a and 213b to decrease the weight of the angle block module 210. Thus, it is possible to provide the variable display device 100 of FIG. 2 with a lighter weight.

As stated above, the shaft bearing 217 between the first and second block units 211a and 211b adjacent to each other connects the first ends of the first links 215a and the third ends of the second links 215b.

Here, the shaft bearing 217 is disposed over the raised part 214, and more particularly, over the raised part 214 of the second angle block 213b, and both ends of the shaft bearing 217 are inserted into and guided by holes 214b, which are formed at the raised part sides 214a along a length direction of the raised part sides 214a, respectively.

Namely, the both ends of the shaft bearing 217 are inserted into the holes 214b formed at the raised part sides 214a and inserted into the bearing holes 219 of the first and second links 215a and 215b, respectively.

A roller 217a is installed to the shaft bearing 217. The shaft bearing 217 guides the protrusion 212 of the first angle block 213a such that the protrusion 212 of the first angle block 213a may be inserted into the raised part 214 of the second angle block 213b adjacent to the protrusion 212 of the first angle block 213a. Additionally, the shaft bearing 217 receives driving power due to the rectilinear motion transferred to the first and second links 215a and 215b and vertically lifts the edges of the first and second angle blocks 213a and 213b which are adjacent to each other and in which the protrusion 212 is inserted into the raised part 214.

Also, a groove 214c may be further formed in the raised part 214 to guide the roller 217a. A stopping part 214d may be formed at an edge of the raised part 214, and the shaft bearing 217 and the roller 217a may be prevented from getting out of the raised part 214.

The backcover system 200 may have a curved shape or a flat shape overall as the angle block module 210 may be driven such that the edges of the first and second angle blocks 213a and 213b may be raised or lowered with the driving system 220 at the center.

Accordingly, the variable display device 100 of FIG. 2 according to the exemplary embodiment may be selectively varied and used in the flat mode and the curved mode by the backcover system 200, which is installed at the rear surface of the backcover of the display panel module 110 of FIG. 2.

Here, the flatness controlling unit 300 is installed at each angle block module 210, which is disposed at each of both sides of the driving system 220. The flatness controlling unit 300 improves the flatness of the variable display device 100 of FIG. 2 when the variable display device 100 of FIG. 2 is driven in the flat mode.

The flatness controlling unit 300 includes a wire 310. The wire 310 is guided by and disposed in a flatness controlling groove 320 shown in FIG. 5F, which is formed at a side or at each of both sides of the angle blocks 213 of the angle block module 210 along a length direction of the angle blocks 213.

Figure 5A:
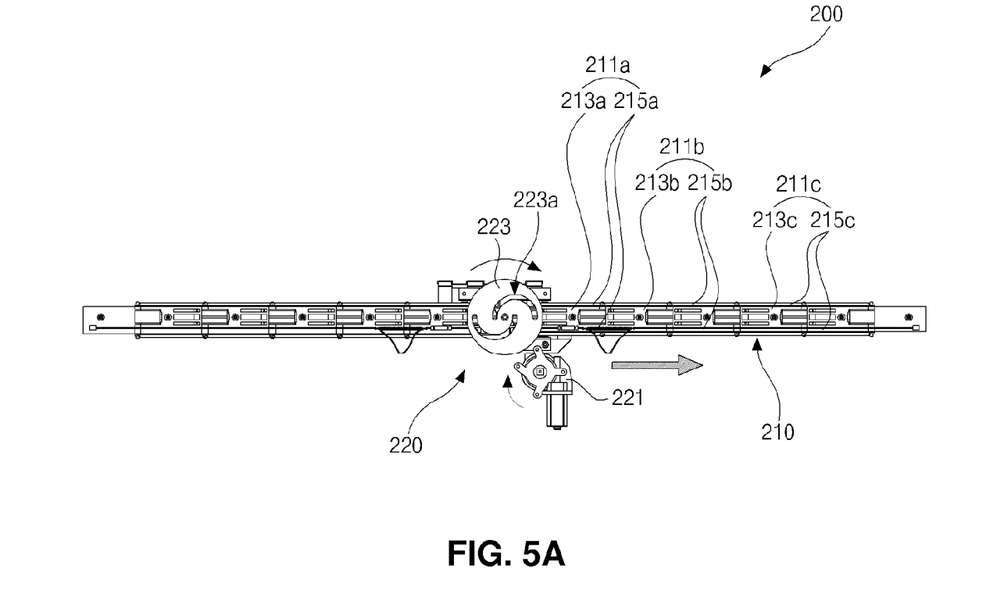
FIGS. 5A to 5G are views schematically illustrating a process of changing a variable display device according to an exemplary embodiment of the present invention from a flat mode into a curved mode.
Figure 5B:
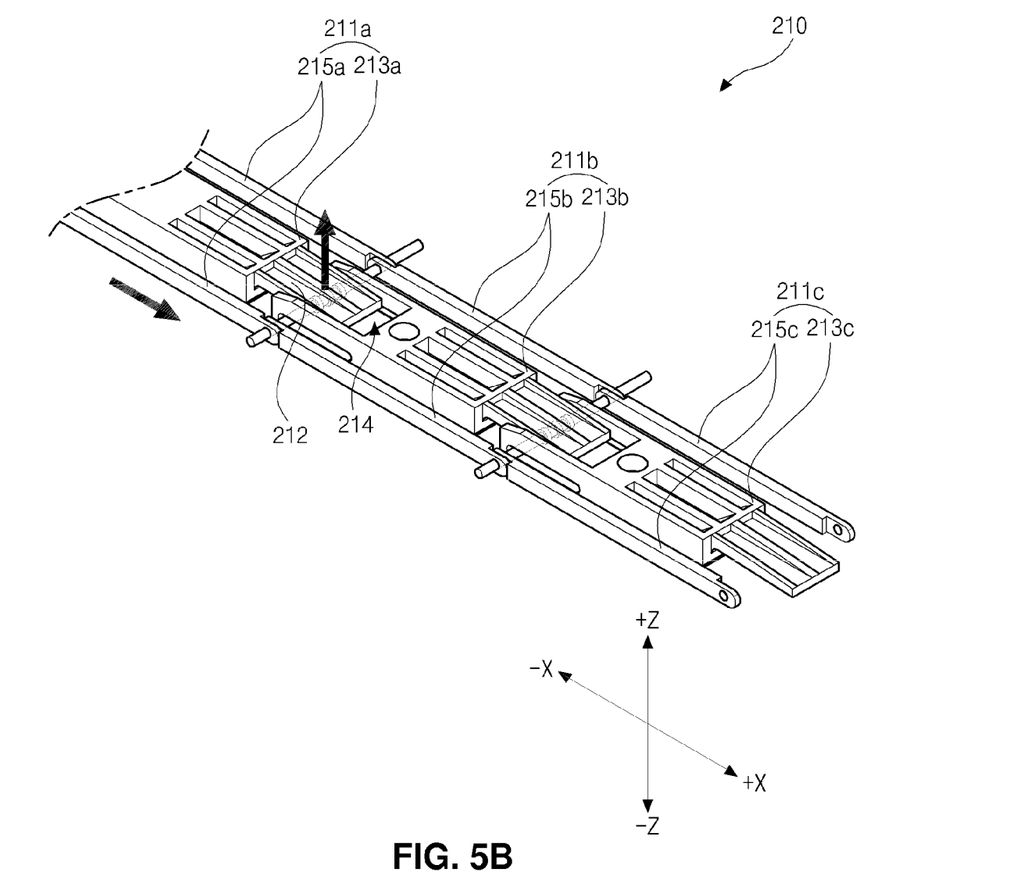
Figure 5C:
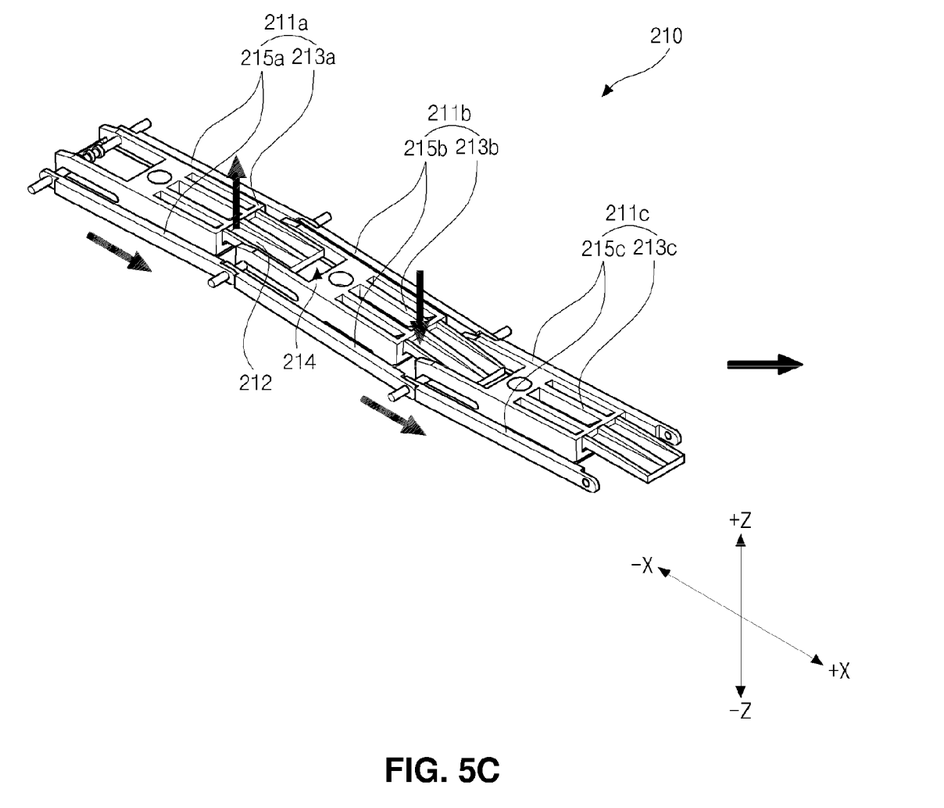
Figure 5D:
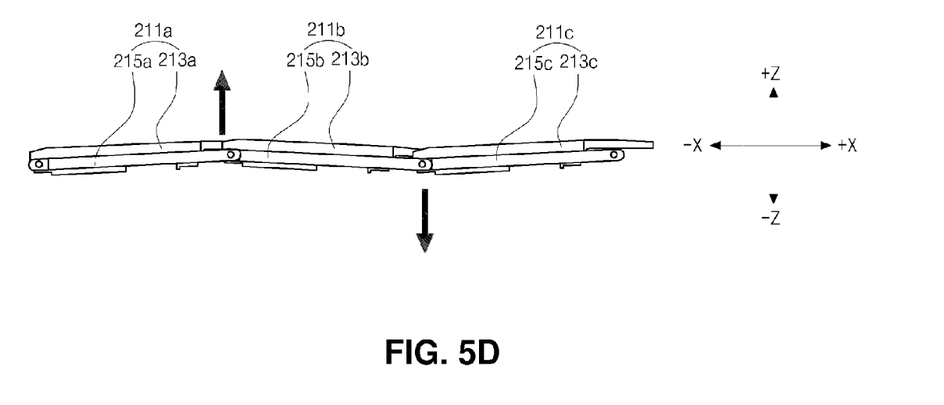
Figure 5E:
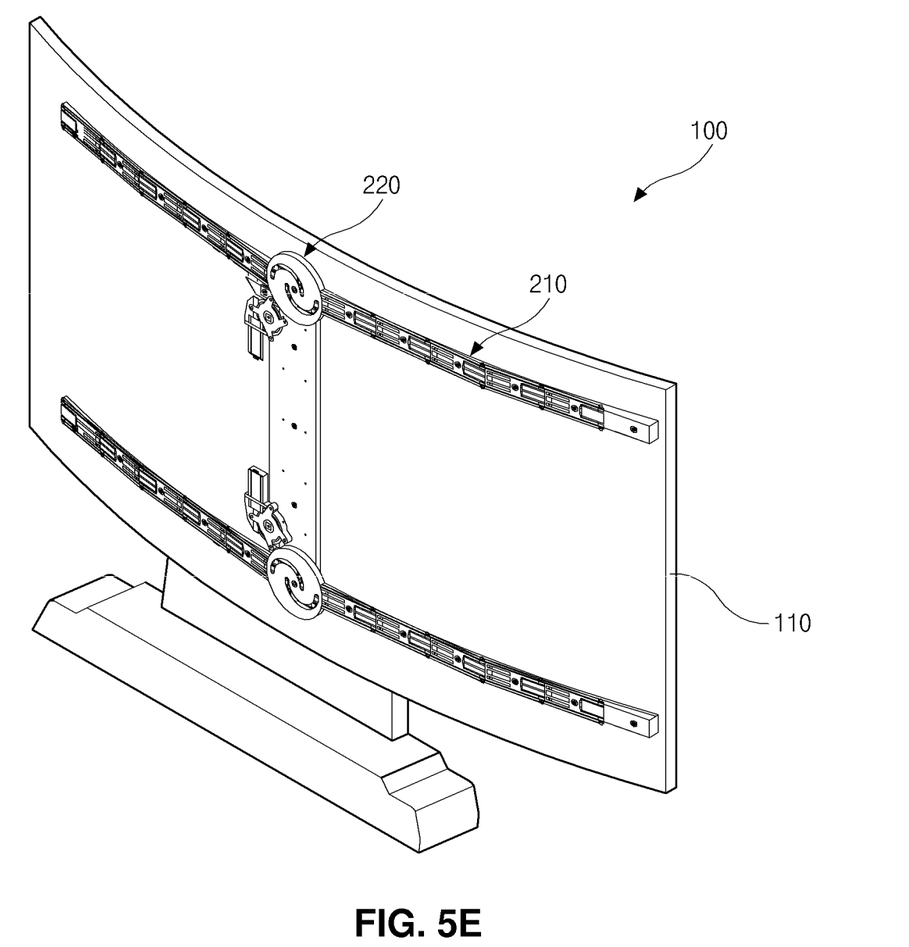

One end of the wire 310 is connected to the motor 221 and the other end of the wire 310 is connected to an end of the angle block module 210 disposed at each of both sides of the driving system 220. The flatness controlling unit 300 includes a tension adjusting part A, which is composed of a portion of the wire 310 and a spring 330 that is connected to the portion of the wire 310, as illustrated in FIGS. 3 and 5G.

Figure 5F:
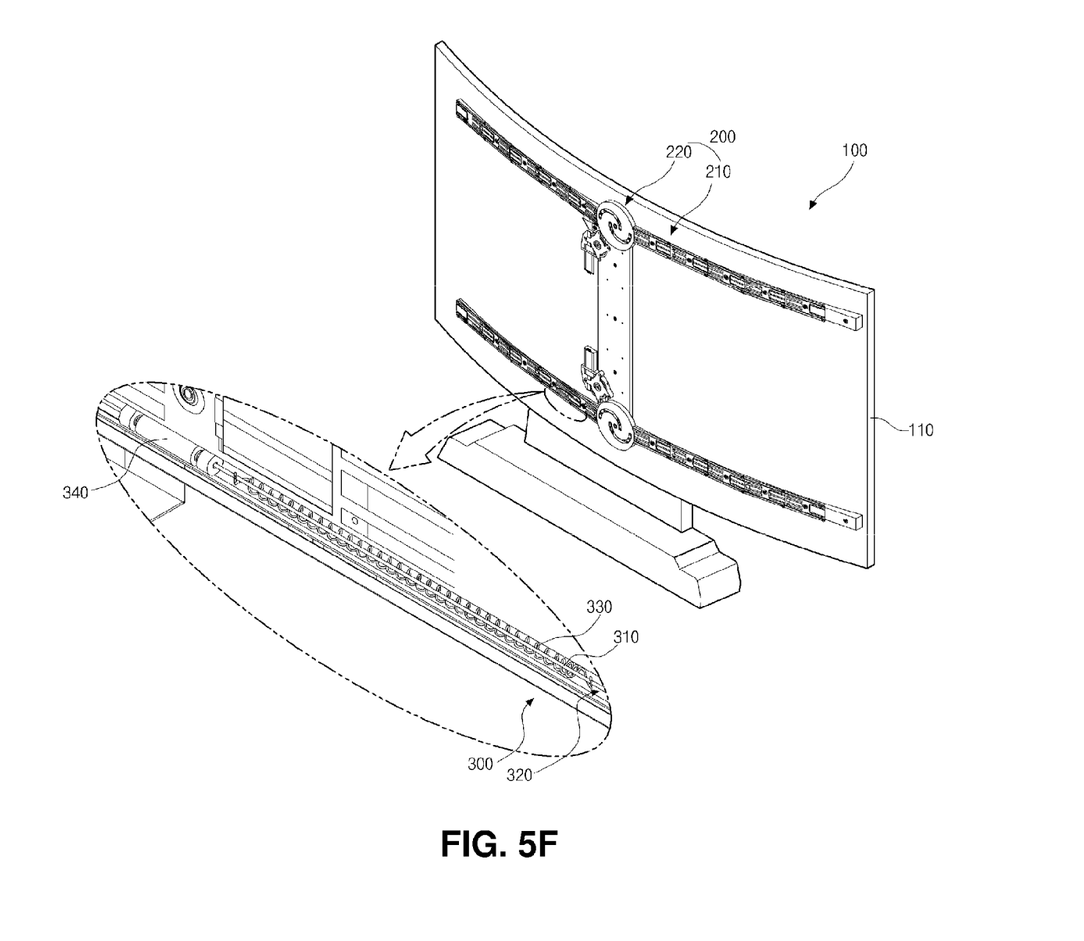
Figure 5G:
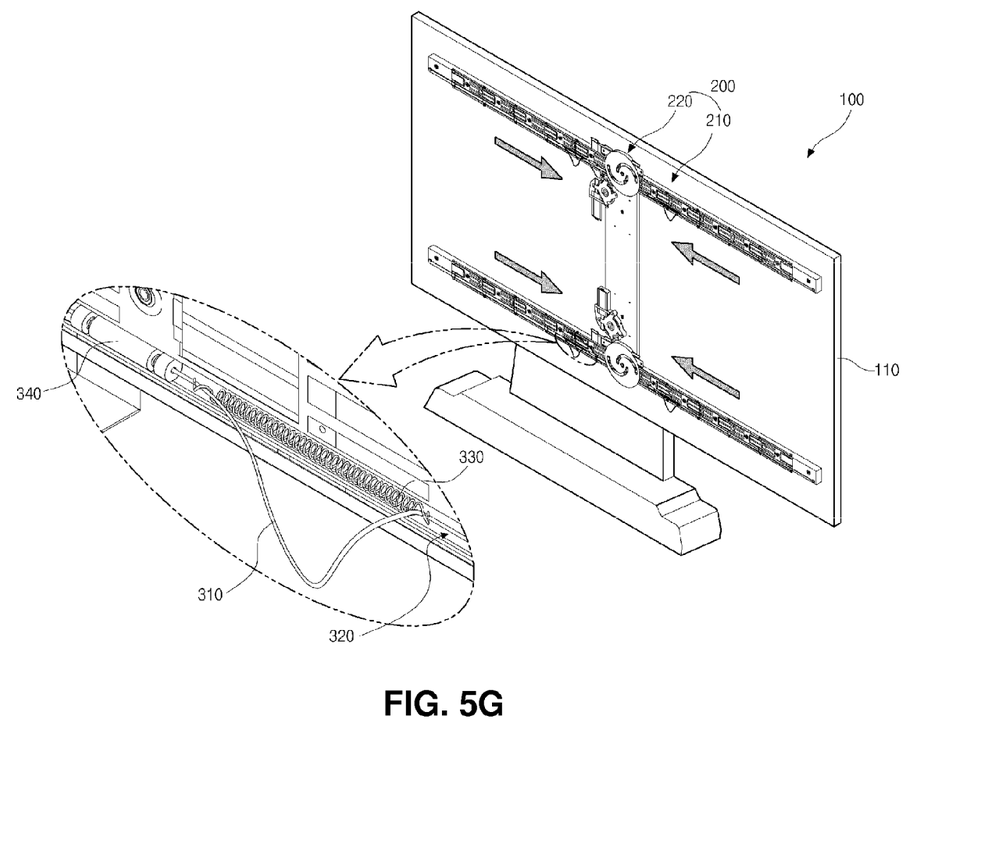

That is, in the flatness controlling unit 300 guided by the flatness controlling groove 320 of FIG. 5F, which is formed along the length direction of the angle block module 210, one end of the spring 330 is connected to a first side of the portion of the wire 310 and the other end of the spring 330 is connected to a second side of the portion of the wire 310. A length of the spring 330 is shorter than a length of the portion of the wire 310.

The wire 310 installed in the angle block module 210 is disposed at each of both sides of the driving system 220 and has a length corresponding to a length of the rear surface of the display panel module 110 of FIG. 2 in a curved mode.

In the variable display device 100 of FIG. 2 according to the exemplary embodiment, when it is driven as the flat mode, the flatness of the variable display device 100 of FIG. 2 is further improved by the flatness controlling unit 300.

Here, a process of changing the variable display device 100 of FIG. 2 from the flat mode to the curved mode using the backcover system 200 will be described in detail with reference to drawings.

FIGS. 5A to 5G are views schematically illustrating a process of changing a variable display device according to an exemplary embodiment from a flat mode into a curved mode. For convenience of explanation, the angle block module will be mainly described.

In FIG. 5A, the backcover system 200 is installed at the rear surface of the backcover of the display panel module 110 of FIG. 2 along a width of the backcover. The angle block module 210 of the backcover system 200 of FIG. 4 is disposed at each of both sides of the display panel module 110 with the driving system 220 in the center.

The block units 211a, 211b, and 211c of the angle block module 210 are fixed to the backcover of the display panel module 110 of FIG. 2.

Here, if the motor 221 is driven clockwise, the gear 223 rotates clockwise, and the rotatory power of the gear 223 is delivered to the first links 215a of the angle block module 210.

Guide grooves 223a are formed in the gear 223 and correspond to the rotatory power. The first links 215a are connected to the guide grooves 223a. Thus, when the gear 223 rotates, the first links 215a move from first ends of the guide grooves 223a to second ends of the guide grooves 223a, whereby the rotatory power of the gear 223 is delivered to the first links 215a.

Because the angle block module 210 is installed at each of both sides of the driving system 220, two guide grooves 223a are formed in the gear and face each other, and each of the guide grooves 223a is connected to the first links 215a of the angle block module 210 at both sides of the driving system 220.

The rotatory power delivered to the first links 215a is changed into rectilinear motion, and as shown in FIG. 5B. The first links 215a move away from the driving system 220, i.e., toward +X-axis direction defined in FIGS. 5B-D. The force generated by movement of the first links 215a contradicts the stationary force of the first and second angle blocks 213a and 213b fixed to the backcover of the display panel module 110 of FIG. 2, and the first ends of the first links 215a and the third ends of the second links 215b connected to each other are lifted toward a direction perpendicular to the moving direction of the first links 215a, i.e., toward +Z-axis direction defined in FIGS. 5B-D.

Because the first ends of the first links 215a and the third ends of the second links 215b are lifted toward the direction perpendicular to the moving direction of the first links 215a, the shaft bearing 217, which connects the first ends of the first links 215a and the third ends of the second links 215b, is also lifted in the +Z-axis direction.

In this action, the shaft bearing 217 is lifted, and thus, the protrusion 212 of the first angle block 213a is inserted into the raised part 214 of the second angle block 213b adjacent to the first angle block 213a by the shaft bearing 217.

In addition, when the protrusion 212 of the first angle block 213a is inserted into the raised part 214 of the second angle block 213b adjacent to the first angle block 213a, the shaft bearing 217 is lifted in succession toward the +Z-axis direction. Therefore, as shown in FIGS. 5C and 5D, the first short side of the first angle block 213a where the protrusion 212 is formed and the second short side of the second angle block 213b where the raised part 214 is formed are lifted together in the +Z-axis direction.

The second short side of the second angle block 213b is lifted in the +Z-axis direction, and thus, the first short side of the second angle block 213b is lowered in −Z-axis direction due to counteraction.

The protrusion 212 is formed to be inclined toward the backcover of the display panel module 110 of FIG. 2, i.e., in the −Z-axis direction defined in the FIGS. 5B-D, with a predetermined angle from one end of the protrusion 212 at the first short side to the other end of the protrusion 212. When the protrusion 212 is inserted into the raised part 214, the second short side of the second angle block 213b is pressed by the protrusion 212.

Accordingly, the first short side of the second angle block 213b is further lowered in the −Z-axis direction.

While the first short side of the second angle block 213b is moved in the −Z-axis direction, the second short side of the third angle block 213c is also moved in the −Z-axis direction. Here, the second short side of the third angle block 213c is adjacent to the second angle block 213b and the raised part 214 is formed at the second short side of the third angle block 213c, whereby the protrusion 212 formed at the first short side of the second angle block 213b is inserted into the raised part 214 of the third angle block 213c.

Moreover, although not shown in the figures, the first short side of the third angle block 213c is similarly moved in the +Z-axis direction due to counteraction, and thus, the angle blocks 213a, 213b, and 213c are linked and driven together.

The first and second short sides of the angle blocks 213a, 213b, and 213c are lifted or lowered, and an angle of the display panel module 110 at which the angle blocks 213a, 213b, and 213c are fixed is controlled by a lifted angle or a lowered angle of the angle blocks 213a, 213b, and 213c.

In addition, the angle block module 210, which is installed at the other side of the driving system 220, is also driven as described above. As a result of these movements, the display panel module 110 with the backcover system 200 installed, as shown in FIG. 5E, has a curved shape with respect to a normal direction.
Accordingly, the curved mode is implemented.

Here, the angle block module 210 is composed of the block units 211a, 211b, and 211c, which includes angle blocks 213a, 213b, and 213c, respectively. Thus, each of the block units 211a, 211b, and 211c functions as a joint, and the backcover system 200 of the present invention can have an accurate curvature in the curved mode.

Namely, since the lifted angle or the lowered angle of each of the angle blocks 213a, 213b, and 213c can be controlled, an expected curvature can be obtained. The number and size of the angle block modules 210 used can vary depending on the size of the display panel module and the amount of curvature desired.

As illustrated in FIGS. 5F-G, the flatness controlling unit 300 is installed at each angle block module 210 disposed at each of both sides of the driving system 220, and the flatness controlling unit 300 includes the wire 310 having one end connected to the motor 221 of the driving system 220 and the other end connected to the end of the angle block module 210. When the display panel module 110 has a curved shape in the curved mode, as shown in FIG. 5F, the spring 330 is lengthened due to elasticity, and at the same time, the wire 310 of the flatness controlling unit 300 is pulled and tightened along the rear surface of the display panel module 110 having the curved shape.

Therefore, tension is given to the wire 310 of the flatness controlling unit 300, and the flatness controlling unit 300 applies pulling force from both ends of the display panel module 110 along the length direction to the display panel module 110 implemented in the curved mode.

From this, when the variable display device 100 is implemented in the curved mode, the flatness of a central portion of the curved display panel module 110 may be improved.

Here, the tension of the wire 310 applied through the flatness controlling unit 300 is smaller than the force applied through the angle block module 210 such that the display panel module 110 is curved. Thus, only the central portion of the variable display device 100 may have improved flatness when it is implemented in the curved mode.

When the variable display device 100 is changed from the curved mode into the flat mode, the motor 221 of the driving system 220 is driven counterclockwise. The gear 223 rotates counterclockwise, and the first links 215a disposed at the second ends of the guide grooves 223a move to the first ends of the guide grooves 223a, whereby the rotatory power of the gear 223 is delivered to the first links 215a.

The rotatory power delivered to the first links 215a is changed into the rectilinear motion, and the first links 215a move toward the driving system 220, i.e., toward the −X-axis direction defined in the FIGS. 5B-D.

The first links 215a move backwards, and the shaft bearing 217 lifted in the +Z-axis direction is lowered. Simultaneously, the protrusion 212 of the first angle block 213a is separated from the raised part 214 of the second angle block 213b adjacent to the first angle block 213a, and the first short side of the first angle block 213a and the second short side of the second angle block 213b are also lowered.

The second short side of the second angle block 213b is lowered, and thus, the first short side of the second angle block 213b is lifted in the +Z-axis direction due to counter-action.

From this, the angle blocks 213a, 213b, and 213c are linked and driven together, and the angle block module 210 is oriented on a straight line.

Accordingly, the display panel module 110 is implemented in the flat mode.

Also, when the display panel module 110 is flat in the flat mode, as shown in FIG. 5G, the lengthened spring 330 of the flatness controlling unit 300 is restored to its original condition, and the wire 310 of the flatness controlling unit 300, which was pulled and tightened along the rear surface of the curved display panel module 110, is relieved of tension and sags.

The sagging only occurs in the tension adjusting part A of FIG. 3 because of the spring 330. When the wire 310 sags, the wire 310 is prevented from being drawn into the motor 221.

Here, a length of the wire 310, excluding the portion of the wire 310 connected to the spring 330, and a length of the wire 330 to which the tension is not given and which is not lengthened, correspond to the length of the rear surface of the display panel module 110 in the flat mode.

If the motor 221 is further driven counterclockwise, the tension is applied to the spring 330, which is not lengthened, and the wire 310 of the flatness controlling unit 300.

From this, the flatness controlling unit 300 applies pulling force from both ends of the display panel module 110 along the length direction to the display panel module 110 implemented in the flat mode. Therefore, the display panel module 110 has improved flatness due to the pulling force from both ends of the length direction when it is implemented in the flat mode.

More particularly, in general, when the variable display device 100 is repeatedly changed between the flat mode and the curved mode, repeated stress is concentrated at the central portion of the variable display device 100 at which the driving system 220 is installed with the angle block module 210 at both sides thereof.

Accordingly, if the variable display device 100 with concentrated stress is continuously changed between the flat mode and the curved mode, rigidity of the central portion of the variable display device 100 with concentrated stress is degraded, and there occurs plastic deformation such as bending of the variable display device 100.

Then, when the variable display device 100 is changed from the curved mode into the flat mode, the flatness of the central portion of the variable display device 100 is reduced because of the plastic deformation of the central portion of the variable display device 100.

Therefore, the variable display device 100 according to the exemplary embodiment of the present invention includes the backcover system 200 with the flatness controlling unit 300. Since the pulling force from both ends of the length direction of the display panel module 110 is applied to the display panel module 110 by the wire 310 of the flatness controlling unit 300, the flatness can be improved even if the plastic deformation occurs at the central portion of the variable display device 100.

In the meantime, the wire 310 of the flatness controlling unit 30 may be equipped with a tightening apparatus for adjusting the tension of the wire 310, such as a turnbuckle 340. The turnbuckle 340 may include screw rods at both ends of its length direction. For example, a male screw of one end may be a right-handed screw, and a male screw of the other end may be a left-handed screw. If a component having a female screw, that is, an adjusting nut rotates, the two male screws approach each other. If the adjusting nut rotates oppositely, the two male screws go far away from each other and adjusting tension in the wire.

When the tension is weakened by long-term use of the wire 310 of the flatness controlling unit 300, or other adjustment is needed, the tension of the wire 310 can be adjusted by the turnbuckle 340.

As mentioned above, the variable display device 100 of the present disclosure can be selectively varied and used as the flat mode or the curved mode by the backcover system 200, which is installed at the rear surface of the display panel module 110.

Namely, in an open space such as an outdoor square or in an indoor square such as airports or terminals, for example, the variable display device of the present disclosure can be implemented in the flat mode such that the variable display device has wide viewing angles and news or advertisements from images displayed by the display panel are provided to many viewers. Alternatively, the variable display device of the present disclosure can be implemented in the curved mode such that the viewer is further immersed in watching, watches more realistic images, and feels comfortable.

Accordingly, the user or provider can selectively use the variable display device 100 of the present invention in the flat mode or the curved mode for the convenience of the user as occasion demands.

Here, when the variable display device 100 of the present disclosure is changed between the flat mode and the curved mode, vibrations and noises hardly occur. Since the backcover system 200 is composed of the driving system 220 and the angle block module 210 and the angle block module 210 is directly installed at the rear surface of the backcover of the display panel module 110, the volume and weight of the backcover system 200 are minimized in the variable display device 100, and the variable display device 100 has a relatively light weight and thin profile.

It is desirable that the backcover system 200 is installed at both sides of the display panel module 110 along the length direction of the display panel module 110.

Specially, in the variable display device 100 according to the exemplary embodiment of the present disclosure, the backcover system 200 may include the flatness controlling unit 300. The pulling force from both ends of the length direction of the display panel module 110 is applied to the display panel module 110 by the wire 310 of the flatness controlling unit 300, and thus the flatness can be improved even if the plastic deformation occurs at the central portion of the variable display device 100.

It will be apparent to those skilled in the art that various modifications and variation can be made in the present invention without departing from the spirit or scope of the invention. Thus, it is intended that the present disclosure cover the modifications and variations of this disclosure provided they come within the scope of the appended claims and their equivalents.

What is claimed is:

1. A display device capable of being adjusted between flat and curved comprising:
   first and second angle block modules, one in each half of a rear of the display device, the first and the second angle block modules capable of being moved, wherein moving the first and the second angle block modules changes a curvature of the display device; and
   a driving system to move the first and the second angle block modules,
   wherein the first and the second angle block modules each comprise a plurality of links including first links connected to the driving system,
   wherein moving the first links away from the driving system increases the curvature of the display device and moving the first links closer to the driving system decreases the curvature of the display device.

2. The display device of claim 1, further comprising a display panel, wherein changing the curvature of the display device changes a curvature of the display panel.

3. The display device of claim 2, wherein the display panel includes an organic light emitting diode (OLED) device.

4. The display device of claim 1, wherein the first and the second angle block modules further comprise angle blocks.

5. The display device of claim 4, further comprising a shaft bearing connecting links of the plurality of links of adjacent angle blocks.

6. The display device of claim 1, wherein the first and the second angle block modules comprise:
   multiple block units arranged in a row, each block unit having an angle block and links of the plurality of links at two sides of the angle block; and
   a shaft bearing connecting the links of each block unit to links of an adjacent block unit,
   wherein a first angle block module is at a one side of the driving system and a second angle block module is at an opposite side of the driving system.

7. The display device of claim 6, wherein the angle blocks of the multiple block units have a rectangular shape with two long sides and two short sides, the long sides have a length corresponding to the length of the links, the short sides are perpendicular to the long sides and are shorter than the long sides,
   wherein the angle blocks have a protrusion at one of the short sides, and a raised part at the other short side of, and
   wherein a protrusion of one angle block is oriented in a raised part of an adjacent angle block.

8. The display device of claim 1, wherein the driving system comprises:
   a driver generating motion; and
   a driving component delivering the motion to the first and the second angle block modules.

9. The display device of claim 8, wherein the driver includes a motor.

10. The display device of claim 1, further comprising a flatness controlling unit connected to the first and the second angle block modules to flatten the display device.

11. The display device of claim 1, wherein each half of the rear of the display device is a top portion or a bottom portion.

12. The display device of claim 1, wherein the driving system is at a center portion of the rear of the display device between the first and the second angle block modules.

13. A display device capable of being adjusted between flat and curved comprising:
   an adjusting system at a rear of the display device including:
      first and second angle block modules capable of being moved, wherein moving the angle block modules changes a curvature of the display device; and
      a driving system coupled to the angle block module, wherein the driving system moves the angle block modules,
      wherein the first and the second angle block modules each comprise a plurality of links including first links connected to the driving system,
   wherein moving the first links away from the driving system increases the curvature of the display device and moving the first links closer to the driving system decreases the curvature of the display device.

14. The display device of claim 13, wherein the first and the second angle block modules further comprise:

multiple block units arranged in a row, each block unit having an angle block and links of the plurality of links at two sides of the angle block; and a shaft bearing connecting the links of each block unit to links of an adjacent block unit, wherein the first and the second angle block modules are at a side of the driving system.

15. The display device of claim 13, wherein the driving system comprises:

a driver generating motion; and a driver component delivering the motion to the first and the second angle block modules.

16. The display device of claim 15, wherein the driver includes a motor.

17. The display device of claim 13, wherein the driving system is at a center portion of the rear of the display device.

18. A display device capable of being adjusted between flat and curved comprising:

an angle block module at a rear of the display device capable of being moved, wherein a movement of the angle block module changes a curvature of the display device; and a driving system to move the angle block module, wherein the angle block module comprises a plurality of links including first links connected to the driving system, wherein moving the first links away from the driving system increases the curvature of the display device and moving the first links closer to the driving system decreases the curvature of the display device.

19. The display device of claim 18, wherein the angle block module further comprises:

multiple block units arranged in a row, each block unit having an angle block and links of the plurality of links at two sides of the angle block; and a shaft bearing connecting the links of each block unit to links of an adjacent block unit, wherein the angle block module is at a side of the driving system.

20. The display device of claim 19, wherein the angle blocks of the multiple block units have a rectangular shape with two long sides and two short sides, the long sides have a length corresponding to the length of the links, the short sides are perpendicular to the long sides and are shorter than the long sides, wherein the angle blocks have a protrusion at one of the short sides, and a raised part at the other short side of, and wherein a protrusion of one angle block is oriented in a raised part of an adjacent angle block.

21. The display device of claim 18, wherein the driving system comprises:

a driver generating motion; and a driver component delivering the motion to the first and the second angle block modules.

22. The display device of claim 21, wherein the driver includes a motor.

23. The display device of claim 18, wherein the driving system is at a center portion of the rear of the display device.

24. A method of adjusting a display device between flat and curved, the display device having an angle block module at a rear of the display device, the angle block module capable of being moved, and a driving system to move the angle block module, the method comprising the step of:

activating the driving system to move the angle block module and adjusting a curvature of the display device, wherein the angle block module includes first links connected to the driving system, wherein moving the first links away from the driving system increases the curvature of the display device and moving the first links closer to the driving system decreases the curvature of the display device.

25. The method of claim 24, wherein movement of the angle block module causes movement of a portion of the display device in a direction normal to a center of the display device.

26. The method of claim 25, wherein the movement of the portion of the display device causes the display device to curve.

27. The method of claim 25, wherein the movement of the portion of the display device causes the display device to flatten.

28. The method of claim 24, wherein adjusting the curvature of the display device comprises:

driving a driver in the driving system to create motion and delivering the motion to the first links of the angle block module, the motion moving the first links relative to the driver;

by movement of the first links, contradicting a stationary force of angle blocks that are fixed to the rear of the display device and connected to the first links; and moving a shaft bearing connecting the first links to second links in a direction normal to the rear of the display device to move short sides of the angle blocks at an angle relative to the rear of the display device to move the display device with respect to the normal direction.

* * * * *